Inventors
M. A. Rudd
A. Z. Mample

Patented Mar. 15, 1932

1,849,994

UNITED STATES PATENT OFFICE

MAURICE A. RUDD, OF NORTH PLAINFIELD, AND ADOLPH Z. MAMPLE, OF GLEN ROCK, NEW JERSEY, ASSIGNORS TO THE WESTERN UNION TELEGRAPH COMPANY, OF NEW YORK, N. Y., A CORPORATION OF NEW YORK

CABLE FAULT DETECTION AND TELEPHONE SYSTEM

Application filed October 26, 1931. Serial No. 571,210.

This invention relates to electrical testing systems and particularly to a system adapted to indicate any decrease in the insulation resistance between the conductors or between any conductor and the cable sheath or ground of a group of cables, together with means for readily determining which cable in the group is faulty.

It is essential to the proper maintenance of cable systems in which a large number of conductors are grouped together within the sheath of the cable, such as are employed for telegraphy and telephony, to know at all times the condition of the insulation of the system. Trouble arises from a lowering of the insulation resistance of the conductors of the cable due to moisture penetrating the cable through an opening in the metallic sheath either at the splices between adjacent sections or on the sections themselves. The infiltration of moisture is usually at such a slow rate that there is an appreciable difference of time between the instant when a lowering of the insulation resistance occurs upon the outermost conductors or those nearest the sheath, and when the moisture has penetrated to the innermost conductors.

The cable fault detector is in operation during the entire twenty four hours of each day on the entire cable plant of a city so that if a cable gives an indication of a lowering resistance during the night when there are but few working circuits, the fault can be located and repaired before important circuits are connected to the cable in the morning.

This invention resides in a method and means for indicating a lowering of the insulation resistance of a system of conductors due, for instance, to the penetration of moisture within the cable sheath. A further purpose of the invention is to provide means of communication between the wire chief and the lineman on the cable plant of a city.

Figure 1:
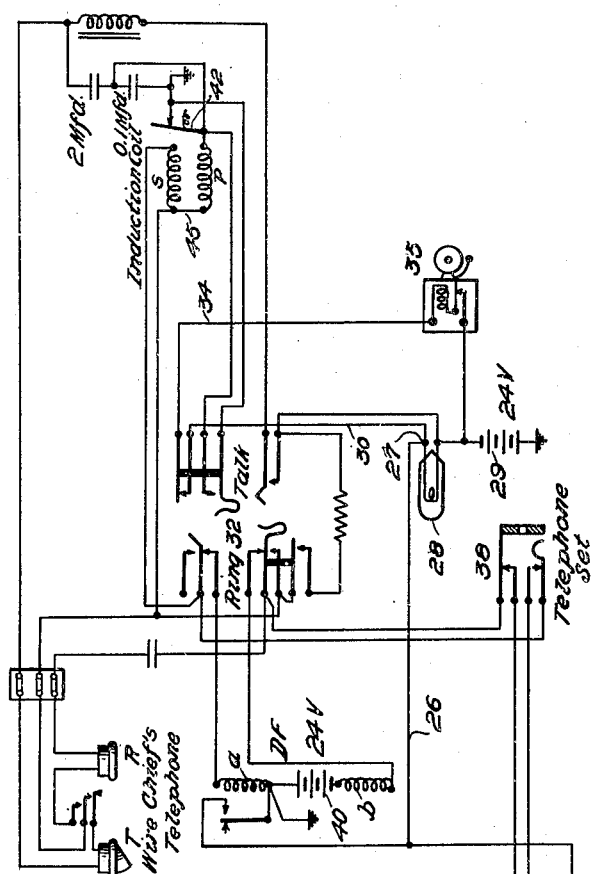
Figure 1:
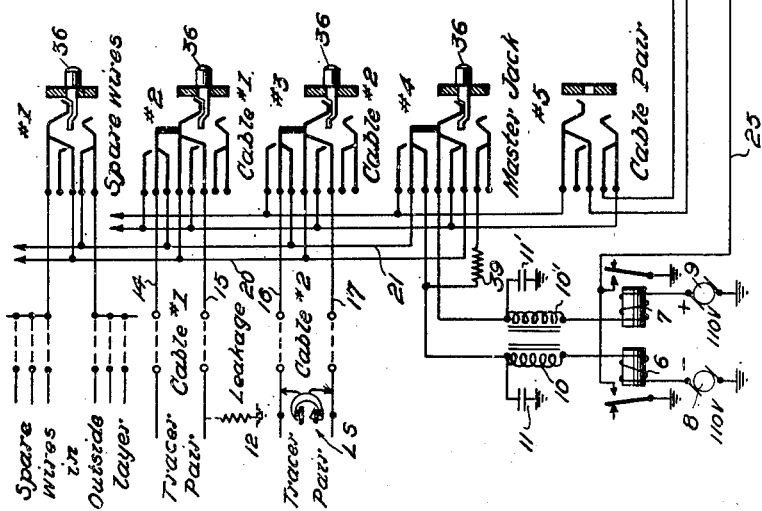
Figure 2:
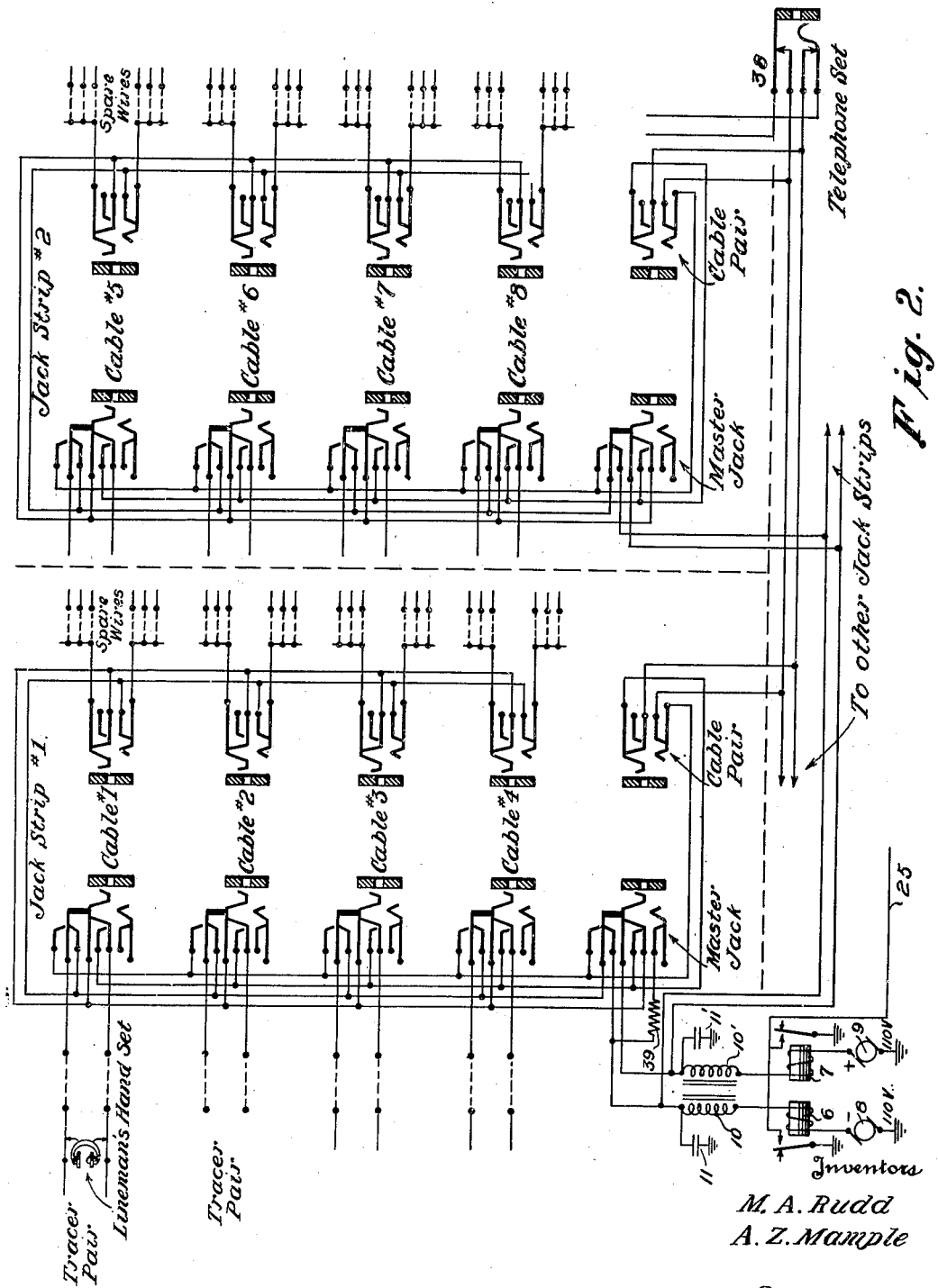

In the accompanying drawings, Figure 1 shows schematically an arrangement embodying the invention; and Figure 2 illustrates the usual grouping of cables terminating in the several jack strips.

Inasmuch as the moisture first penetrates the insulation adjacent the sheath, we connect a pair of conductors in the outermost layer, designated as a "tracer pair", in each cable, with the indicating and alarm apparatus at the main office or central testing station. As a further precaution we also connect a plurality of spare wires in the outer layer to the alarm apparatus. These spare wires should be evenly spaced in the outside layer so that they provide a fault detecting network which will respond to any fault that may develop in the cable. We employ the tracer pair also in the lineman's signaling and telephone circuit by which a lineman may communicate with the wire chief from any point on the cable plant of the city.

A plurality of telephone tracer pairs may be connected to one cable fault detector and telephone installation. For the purpose of illustration we have shown the tracer pairs from only two cables and the spare wires from one cable connected to the detector and telephone circuits at the central testing station. These circuits terminate in individual jacks on the switchboard, these jacks being connected through a master jack to sensitive relays 6, 7 and generators 8, 9. Included in the circuit of each relay is an impedance 10 shunted by a condenser 11 serving as a filter to eliminate inductive peaks due to induction between the lines which would affect the relays. We have employed impedances having an inductance of 100 henries and a resistance of 1750 ohms and condensers having a capacity of 4 microfarads. By mitigating the effect of induction from neighboring lines, these filters allow the sensitive relays to be adjusted to respond to a fault of higher resistance, that is, less leakage current.

When a fault occurs such as a leakage, indicated by the high resistance ground 12 on one of the tracer pair conductors of cable No. 1, a circuit is closed from ground 12 through the leakage resistance, conductor 15, sleeve normal and sleeve contact of jack No. 2, conductor 20, sleeve normal and sleeve contact of the master jack No. 4, impedance 10′, sensitive relay 7 and generator 9 to ground. If leakage occurs between a pair of tracer wires, both of the sensitive relays will operate. Because the voltage involved in this case is 220 volts instead of 110 volts, the relays will respond to a fault of twice the leakage resistance that is required to operate one relay when the fault is to ground. The system will be even more sensitive if voltages higher than 110 volts are used.

The operation of relay 7 closes a circuit from ground through the armature and front contact of relay 7, through conductor 25, conductor 26 to point 27, through lamp 28 and battery 29 to ground. Also from point 27 through conductor 30, upper contacts on the talking side of switch 32, conductor 34, vibrating bell 35 and battery 29 to ground, thus causing both visual and audible alarm signals at the central testing station.

To locate the faulty cable: If the cables are arranged in groups of say four cables terminating in each jack strip of the switchboard, as illustrated in Fig. 2, the faulty cable is in the group which, when removed from the detector circuit, extinguishes the lamp. The groups of cables can be removed successively from the fault detector circuit by operating the jack keys 36 in the master jacks of the jack strips. The jack keys are similar to dummy keys with a cut-away portion or recess in the side which permits the jack contacts to remain closed when in normal position. To open the jack contacts, the key is rotated 180°, thus causing the tip and sleeve springs to part from their normal contacts. The construction of this jack is covered in copending application, Serial No. 469,122 and is also disclosed at Figure 4 of Patent 1,817,738.

Having determined the jack strip to which the group of cables containing the faulty cable is connected, the particular cable containing the fault can then be determined. The jack key in the master jack is first restored to its normal position to connect the group of cables containing the faulty cable to the fault detector circuit, thereby again operating the sensitive relay and lighting the lamp. Then by operating the jack keys 36 in succession to disconnect the tracer pairs, and spare wires, the faulty cable will be determined when the light is extinguished by the operation of its jack keys. The tracer pair of the faulty cable can then be tested in the regular manner by connecting the testing equipment to the cable pair jack No. 5. If the fault is a low resistance leak occurring on only one conductor of a tracer pair, operating the jack keys 36 of the master jacks would not extinguish the light because this fault, which is then connected to the telephone apparatus, would unbalance the differential relay DF causing the armature of this differential relay to close a circuit from ground through the lamp to battery 29 thus causing the lamp to remain lighted. In this case it will be necessary to remove the telephone apparatus by inserting a dummy plug in the telephone set jack 38 and to repeat the test.

To insure the operative condition of the sensitive relays 6 and 7, they should be tested at frequent intervals. For this purpose a resistance unit 39 of say 1½ magohms is connected directly across the relays by turning the jack key 36 in the master jack approximately ⅛ of a turn. In this position it connects the sleeve to the tip through the jack key, without opening the tip normal contact, the resistance unit, which corresponds to leakage, is directly across the sensitive relays and they should both operate if sensitively adjusted.

The lineman who carries a hand telephone set may communicate with the wire chief at the central testing station by bridging this hand set across the tracer pair of any cable. Since this tracer pair is bridged to all of the tracer pairs of the lateral cables, an extensive network of telephone facilities is provided.

When the lineman connects his hand set across the tracer pair, the same lamp is lighted that is operated when a fault occurs on this network of wires. To locate the cable on which the lineman is calling, much the same procedure is followed as for locating a faulty cable. The wire chief operates the master jack key 36 of each jack strip until the lamp is extinguished. Operating the jack key 36 in the master jack on the strip containing the terminals of the group which includes the cable to which the lineman has connected his hand set, automatically connects these cables to the circuits of the wire chief's telephone. By throwing the key lever of switch 32 toward the right into talking position, the wire chief can ask the lineman which cable he is on and he can then operate the jack key associated with that cable to connect the telephone facilities to that particular cable. The jack key in the master jack is then returned to normal position to remove the telephone facilities from the other cables of the group and reconnect them to the fault detector circuits.

The battery 40 is now connected through the coils $a, b$ of the differential relay DF, the cable pair jack No. 5 and jack No. 3, to the lineman's set LS across cable No. 2. As long as equal currents flow through the two windings of the differential relay DF, the relay will not operate. Unequal currents are caused to flow through these windings when the lineman grounds either conductor of the tracer pair, thereby operating the relay and closing a circuit from ground through its armature through the signal lamp 28 to battery 29. This provides a supervisory feature by which a lineman can at any time signal the wire chief.

The wire chief can also signal the lineman when his hand set has been left unattended across a tracer pair by throwing the key lever of the switch 32 toward the left into the ringing position. When this is done, a loud penetrating tone is produced in the receiver of the lineman's hand set by the operation of the interrupter 42 on the induction coil 45.

The telephone facilities can evidently be used by two or more linemen on the same or different cables. This communication circuit may aid in the splicing of cables and other repair work. Either lineman can signal the wire chief when desired by grounding one of the wires of the telephone circuit. The jack keys of the two cables are operated to furnish talking battery to linemen on different cables.

Our cable fault detector and telephone system provides a very sensitive arrangement for indicating a lowering of the insulation resistance between the wires of the tracer pair or the test wires, or between any of the wires and ground or the cable sheath which is normally grounded. It also provides a lineman and wire chief's communication circuit which enables the lineman to communicate with the wire chief at any time from any point in the cable plant of a central office.

We claim:

1. In an arrangement for determining the condition of the insulation of conductors in a transmission system, the combination of a cable comprising a plurality of insulated conductors enclosed within a grounded metal sheath, a conductor within said cable terminating in a jack at a central testing station, a relay located at said station having one terminal connected to a master jack, the other terminal being connected to a grounded source of potential, an alarm apparatus controlled by said relay and circuit arrangements including said jacks for disconnecting said conductor from said relay and connecting said conductor directly to said alarm apparatus.

2. In an arrangement for determining the condition of the insulation of conductors in a transmission system, the combination of a cable comprising a plurality of insulated conductors enclosed within a grounded metal sheath, a pair of conductors within said cable and adjacent the sheath thereof, said pair terminating in a jack at a central testing station, relays at said station normally connected to said pair of conductors through said jack, alarm apparatus controlled by said relays, telephone apparatus at said station, and switching means for disconnecting said pair from said relays and connecting said pair to the telephone apparatus.

3. In a system as defined in claim 2 means for mitigating extraneous inductive effects from said relays.

4. In a system as defined in claim 2, means associated with said telephone apparatus for actuating said alarm apparatus upon the grounding of either conductor of said pair, whereby a lineman may at all times signal said station.

5. In a system as defined in claim 2, means for testing the operation of said relays by momentarily connecting a resistance, equivalent to a leak or faulty condition, across the relay terminals while maintaining their normal connection to said pair of conductors.

6. In an arrangement for determining the condition of the insulation of conductors in a transmission system, the combination of a plurality of cables each comprising a number of insulated conductors enclosed within a grounded metal sheath, a plurality of test conductors within each cable and adjacent the sheaths thereof, said conductors being connected in groups to master jacks at a central testing station, relays at said station normally connected through said jacks to said conductors, alarm apparatus controlled by said relays, and means associated with said jacks for disconnecting any of said groups from said relays.

7. In an arrangement for determining the condition of the insulation of conductors in a transmission system, the combination of a plurality of cables each comprising a number of insulated conductors enclosed within a grounded metal sheath, a pair of test conductors within each cable and adjacent the sheaths thereof, said pairs being connected in groups to master jacks at a central testing station, relays at said station normally connected through said jacks to said pairs of conductors, alarm apparatus controlled by said relays, means associated with said jacks for disconnecting any of said groups from said relays, telephone apparatus at said station, and switching apparatus for disconnecting any pair of test conductors from connection with said relays and connecting said pair to the telephone apparatus.

In testimony whereof, we affix our signatures.

MAURICE A. RUDD.
ADOLPH Z. MAMPLE.